United States Patent [19]
Niki

[11] Patent Number: 4,844,018
[45] Date of Patent: Jul. 4, 1989

[54] WATER SUPPLYING SYSTEM FOR SMALL-ANIMAL CAGES

[75] Inventor: Motohiro Niki, Tokyo, Japan

[73] Assignees: Etsuko Niki; Mieko Niki; Misako Niki, all of Tokyo, Japan

[21] Appl. No.: 191,812

[22] Filed: May 4, 1988

Related U.S. Application Data

[63] Continuation of Ser. No. 36,792, Apr. 10, 1987, abandoned.

[30] Foreign Application Priority Data

Apr. 16, 1986 [JP] Japan ................................ 61-87294

[51] Int. Cl.$^4$ .............................................. A01K 7/00
[52] U.S. Cl. ...................................... 119/72.5; 119/18
[58] Field of Search ..................... 119/18, 72.5, 17, 15

[56] References Cited

U.S. PATENT DOCUMENTS

| | | | |
|---|---|---|---|
| 3,220,383 | 11/1965 | Bruner | 119/17 |
| 3,742,908 | 7/1973 | Merino | 119/15 |
| 4,027,626 | 6/1977 | DeSousa | 119/15 |

FOREIGN PATENT DOCUMENTS 1427202  3/1976  United Kingdom ................. 119/18

Primary Examiner—Robert Peshock
Attorney, Agent, or Firm—Ladas & Parry

[57] ABSTRACT

In a water supplying system for small animal cages, a main pipe connected to a water supply source, and branch pipes connected to the main pipe are made of a transparent, flexible material such as silicone resin. These main pipe and branch pipes are detachable to be disassembled for cleaning and sterilization whereby multiplication of bacteria in these pipes can be prevented.

20 Claims, 3 Drawing Sheets

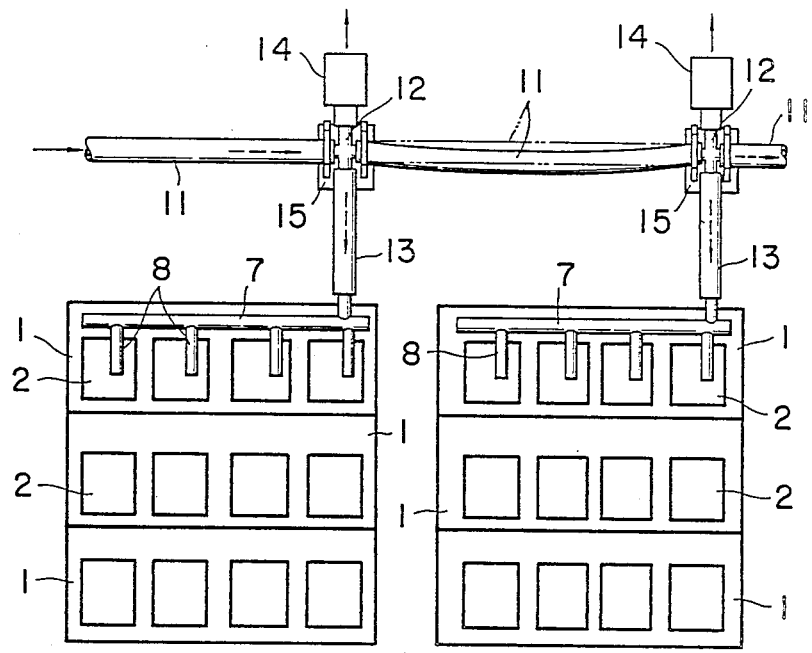
FIG. 1
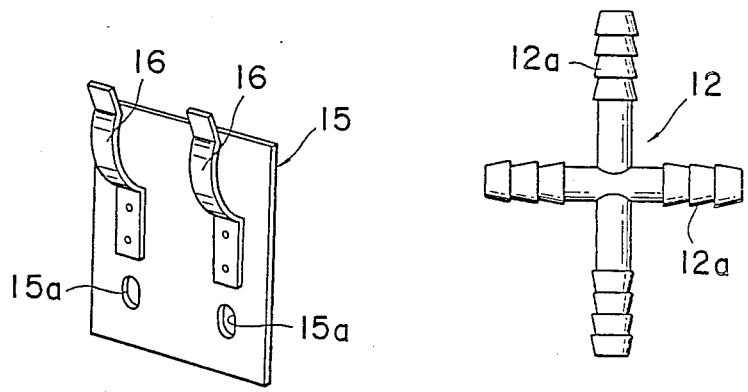
FIG. 2
FIG. 3

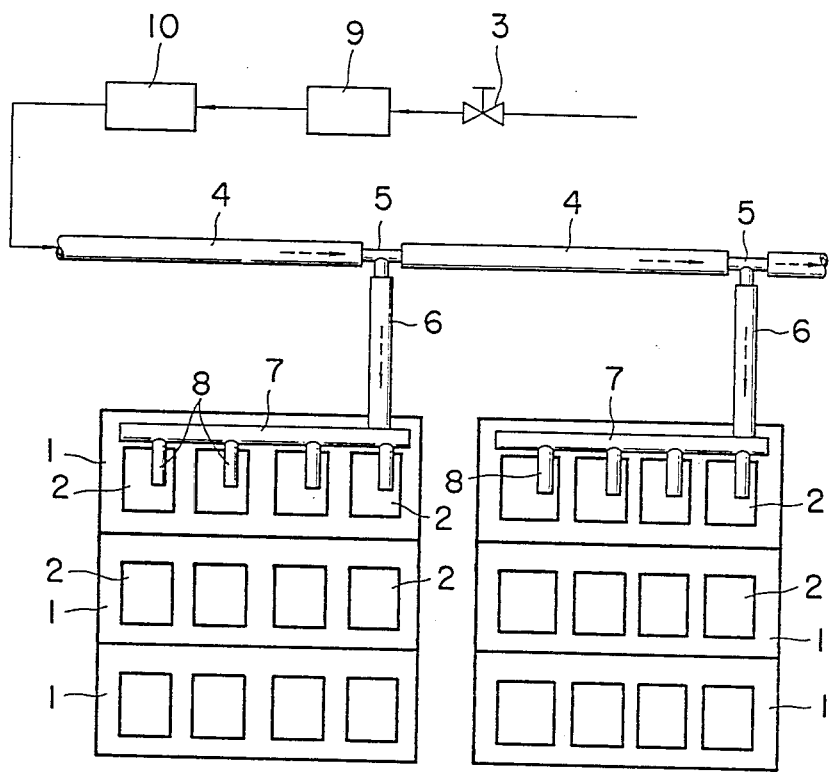
F I G. 6

WATER SUPPLYING SYSTEM FOR SMALL-ANIMAL CAGES

This is a continuation of co-pending application Ser. No. 036,792 filed on Apr. 10, 1987, now abandoned.

BACKGROUND OF THE INVENTION

This invention relates to a water supplying system for small-animal cages and more particularly to a water supplying system for supplying drinking water to cages in which small animals such as mice and rats for experiments are housed at research or laboratory facilities.

The conventional water supply system for small animal cages has water supply pipes for supplying water from a water supply source to the cages as will be described hereinafter. In the conventional system, the water supply pipes cannot be disassembled readily for sterilization, and water tends to stagnate in the piping. Such conditions are favorable for generation of bacteria, and accurate experimental results cannot be obtained.

SUMMARY OF THE INVENTION

An object of the present invention is to provide a water supplying system for small animal cages, in which the piping can be disassembled for autoclave sterilization; in which air bubbles in the piping which contribute to the multiplication of bacteria can be removed; and in which water can pass rapidly through the piping, whereby the multiplication of bacteria can be readily prevented without installing an ultraviolet-ray lamp or the like.

The above object of the present invention has been achieved by a water supply system for small animal cages which comprises a main pipe, branch pipes, headers disposed in respective tiered spaces, and local pipes connected to the headers, drinking water flowing through the main pipe, the branch pipes, the headers and through the local pipes into each of the cages, the main pipe and the branch pipes being made of transparent, flexible material, e.g., silicone resin, and air vent means being provided at suitable positions in the main pipe, e.g., at the upper ends of vertical pipes of cross-shaped coupling pipes which are used to intercommunicate portions or spans into which the main pipe is divided.

The main pipe and the branch pipes between a pressure-reducing valve and the headers, which are made of flexible, transparent material, because of their flexibility can be easily curved and disassembled to be autoclave-sterilized regularly, e.g., every week or every ten days, or at any time. Because of their transparency, the interior water conditions within these pipes are visible from the outside. Depending on their observed water conditions, the main pipe and the branch pipes can be autoclave-sterilized. When air bubbles are observed in the pipes, the air is let out naturally and at any time through the air vent means so as to prevent multiplication of bacteria in the pipes without the use of an ultraviolet-ray lamp or the like. The piping becomes accordingly shorter, and the water moves in a shorter period through the piping.

BRIEF DESCRIPTION OF THE DRAWINGS

In the drawings:

FIG. 1 is a partial general front view of an embodiment of the system according to this invention;

FIG. 2 is a perspective view of an example of a mounting fixture used in the system shown in FIG. 1;

FIG. 3 is a front view of an example of a cross-shaped coupling pipe used in the system shown in FIG. 1;

FIG. 6 is a partial general front view of a prior art system.

DETAILED DESCRIPTION OF THE INVENTION

Figure 4:
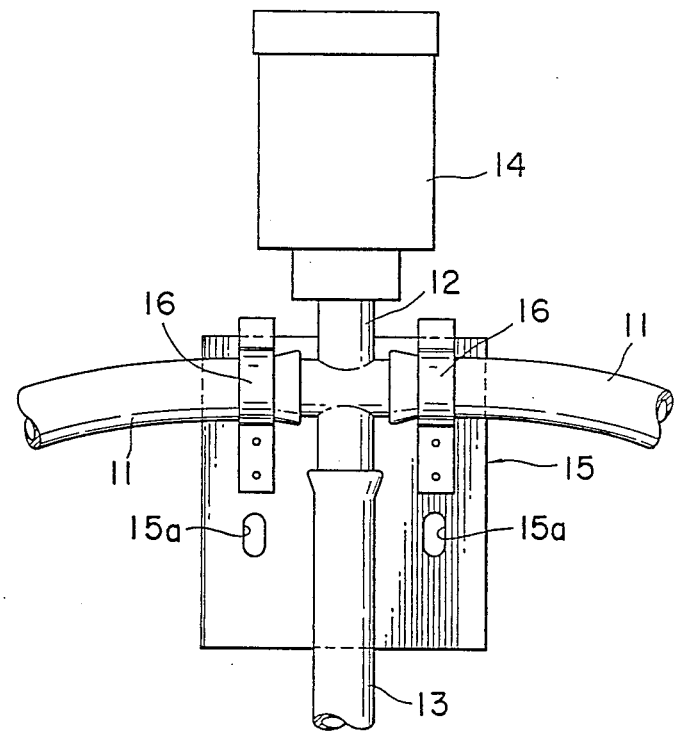
FIG. 4 is a front view of the cross-shaped coupling pipe intercommunicating adjacent ends of portions of a main pipe and connected to a branch pipe and air vent means.

As conducive to a full understanding of this invention, the general nature, attendant problems, and limitations of the conventional water supply system for small-animal cages, briefly described hereinbefore, will first be described with reference to FIG. 6.

The conventional installation for housing small animals comprises one or more rack-like structures as shown in FIG. 6, each having a plurality of spaced-apart floors or shelves dividing the interior thereof to define spaces 1, 1, 1, . . . , and a plurality of cages 2, 2, 2, . . . placed on each of the shelves.

In the piping of the conventional system for supplying drinking water to each of the cages, water is supplied into a horizontal main pipe 4 from a water supply source through a pressure-reducing valve 3, then passes through vertical branch pipes 6, and headers 7 positioned for each shelf, and is fed to the cages 2 through local pipes 8.

The main pipe 4 is divided into a plurality of consecutively joined portions or spans which are intercommunicated through T-shaped coupling pipes 5. The vertical stem pipe of each T-shaped coupling pipe 5 is connected to the upper end of a branch pipe 6, which at its lower end is connected to one end of a header 7 positioned in each space. Each header is connected to spaced-apart local pipes, 8, 8, . . . for supplying water to respective cages. Air vent means is provided at the terminal of the piping of each rack structure thereby to supply water to each cage 2 of the rack independently. An ultraviolet-ray lamp 9 for sterilizing the water fed through the pressure-reducing valve 3 and a membrane filter 10 for removing bacteria, virus, etc. from the water are provided as shown in the pipe line between the valve 3 and the main pipe 4.

In such a conventional system the main pipe 4 and the branch pipes are ordinarily made of iron, vinyl chloride resin, or some other material, and thus they are fixed in most cases, whereby they cannot be disassembled for autoclave sterilization. Furthermore, experimental animals are so small that the intake of water of one animal per day is as small as about 3 cc for a mouse and about 30 cc for a rat, and further each dose of water is about 0.01 cc for a mouse, and about 0.05 cc for a rat. Because of their small intake of water, the water in the piping undergoes almost no advance flow, and therefore the water stagnates in the piping. If the air in the piping is polluted with bacteria, this stagnation will cause their multiplication. In order to prevent such multiplication of bacteria, the ultraviolet-ray lamp 9 and the membrane filter 10 have been indispensably necessary.

Moreover, the installation of the ultraviolet-ray lamp 9 and the membrane filter 10 makes the piping itself longer, especially for experimental small animals, the pressure of the water must be decreased by the pressure-reducing valve 3, whereby it takes one week to ten days for a mouse, for example, to drink up all of the water in the piping.

It is essential for the experimental animals to be fed with clean water as much as possible in order to obtain accurate results of medication experiments on them. This is because polluted water causes medicated animals to lose their weight or to die, which would cause inaccuracies in the experimental results.

FIGS. 1 through 4 show an embodiment of the system according to this invention. As in the prior art, cages 2, 2, . . . are placed horizontally on respective shelves defining space 1, 1, . . . in a rack structure. Headers 7 are disposed above respective spaces 1, 1, . . . (Headers 7 are not shown in the intermediate and lower feeding spaces.) To each header 7 are connected local pipes 8, 8, . . . which have their downstream ends openable in the corresponding cages 2, 2, . . .

A transparent and flexible main pipe 11 made of silicone resin, for example, supplies water from a water source (not shown) by way of a pressure-reducing valve 3. (See FIG. 6.) The main pipe 11 is divided into a plurality of consecutive portions or spans so that each of the spans is located above a respective one rack. The adjacent ends of the spans of the main pipe 11 are connected to the horizontal branch pipes of cross-shaped coupling pipes 12 thereby to intercommunicate with one another. The cross-shaped coupling pipes 12 are made of a transparent synthetic resin, or the like.

The main pipe 11 preferably has a bore of 3 to 6 mm. An excessively large-bore pipe 11 will sag downward by its own weight unless provided with extra supports, while a pipe 11 which is too thin cannot supply sufficient water.

The downwardly extending branch pipe of each of the cross-shaped coupling pipes 12 is connected to the upper end of a branch pipe 13. The branch pipe 13 is made of the same transparent, flexible material as the main pipe 11, e.g., silicone resin. The lower end of the branch pipe 13 is connected to a header 7. The water flowing through the main pipe 11 is branched through the branch pipes 13 into the headers 7 and then flows from the headers 7 to respective cages 2, 2, . . . through the local pipes 8, 8, . . . A known air vent means 14 is connected to the upwardly extending branch pipe of each crossshaped coupling pipe 12.

The air vent means 14 in the main pipe 11 positively lets out any air in the pipe 11 thereby to prevent the multiplication of bacteria. Consequently, there is no need for the use of the ultraviolet lamp 10 and the membrane filter 10 of the prior art shown in FIG. 6. The air vent means 14, which are connected to the upper branch pipes of the cross-shaped coupling pipes 12, are disposed at a level higher than the spans of the main pipe 11 deflected downward by their own weight. This arrangement permits the air in the main pipe 11 to flow up naturally to the air vent means 14 to be discharged outside. By pushing up the sagging middle parts of the portions of the main pipe 11 as shown by the phantom lines in FIG. 1, the water in these portions can be thoroughly drained.

A preferred example of the cross-shaped coupling pipe 12 is shown in FIG. 3. Preferably the end parts of the crossed pipes of the coupling pipe 12 have saw-like notches for providing secure joints between the coupling pipe 12 and the spans of the main pipe 11, the air vent means 14, and the branch pipe 13.

The portions of the main pipe 11 which are removably connected to the horizontal branch pipes of each crossshaped coupling pipe 12 are supported by means of a mounting fixture 15. As shown in FIG. 2, each mounting fixture 15 has leaf springs 16, 16 through holes 15a, 15a. The leaf springs 16, 16 at their lower end portions are fixed to the body of the fixture 15, and their upper end portions are opened upward. The fixture 15 is secured to a firm structure such as a wall, or a pillar by means of bolts (not shown) passed through the holes 15a, 15a. Each cross-shaped coupling pipe 12 connecting the ends of two main pipe spans is held by the leaf springs 16, 16 against the body of the fixture 15. As shown in FIG. 4 the ends of the two adjacent spans of the main pipe 11 to be intercommunicated are removably secured between the leaf springs 16, 16 and the body of the mounting fixture 15.

The mounting fixture 15 may be secured to a wall, pillar or the like by an adhesive. Instead of using the mounting fixture 15, the main pipe 11 may be secured to a wall or pillar by adhesive tapes.

Figure 5:
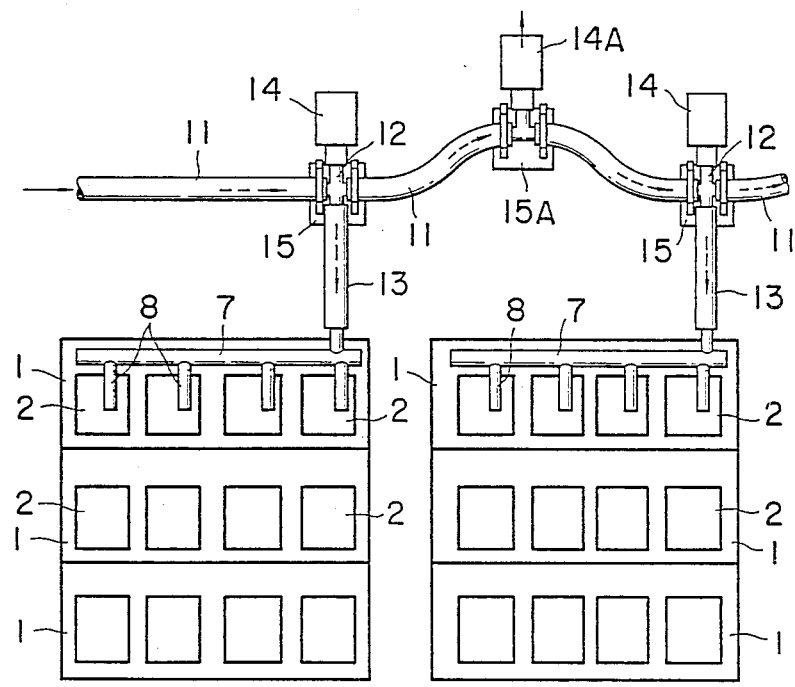
FIG. 5 is a partial general front view similar to FIG. 1 of another embodiment of the system according to this invention.

In another embodiment of the system according to this invention as shown in FIG. 5, a T-shaped coupling pipe is further installed in each span of the main pipe 11 at a point intermediate between adjacent cross-shaped coupling pipes 12. An air vent means 14A is connected to the end of the vertical branch, which is directed upward, of the T-shaped coupling pipe. The coupling pipe and the ends of the main pipe 11 connected thereto are supported and held by a mounting fixture 15A which is secured to a wall, pillar or the like at a height such that the main pipe 11 at its part connected to the T-shaped coupling pipe is at its highest position. This arrangement permits the air in the portions of the main pipe 11 to be discharged also through the air vents means 14A.

What is claimed is:

1. A water supplying system for small animal cages, comprising a main pipe connectable to a water supply source; branch pipes branching from the main pipe; headers connectable to the downstream ends of respective branch pipes; and local pipes having a first end connectable to the headers and a second end openable in respective cages, whereby drinking water can be fed through said local pipes and headers from the water supply source to each of the cages, wherein the main pipe and the branch pipes are made of transparent, flexible tubing and are detachable from other parts of the system to be disassembled for cleaning and sterilization, wherein the main pipe is divided into a plurality of consecutive portions or spans, which are successively connected by transverse pipes of junction couplers wherein each junction coupler has an upright pipe connectable to an air vent means and a further pipe connectable to a respective branch pipe, and wherein further air vent means are provided in said spans of the main pipe at positions thereof between adjacent junction couplers, said main pipe having high portions and adjacent low portions, said further air vent means being located substantially at the high portions.

2. A system according to claim 1 in which said tubing is formed from silicone resin.

3. A system according to claim 1, wherein the junction couplers are cross-shaped, and wherein the air vent means is located substantially at the apices of the high portions.

4. A system according to claim 1, wherein a mounting fixture supports the transverse pipes and is securable to a firm structure so as to position the transverse pipes.

5. A system according to claim 4, wherein the mounting fixture has a front and a back side and comprises at least one leaf spring having a first end portion fixed to the front side of the fixture and an second end portion extending outward from the first end portion, and wherein the second end portion is connectable to the main pipe so as to press the main pipe against the transverse pipes and the front side of the fixture.

6. A system according to claim 5, wherein the main pipes, branch pipes, and air vent means are respectively fitted frictionally and detachably on adjoining ends of the transverse pipes, further pipes, and upright pipes by means of saw-like notches on the transverse, further and upright pipes, and wherein at least one mounting hold in the fixture is provided for a coupling means to secure the fixture to a firm structure such as a wall or pillar.

7. A water supplying system for small animal cages, comprising: a main pipe connectable to a water supply source; branch pipes branching from the main pipe; headers connectable to the downstream ends of respective branch pipes; local pipes having a first end connectable to the headers and a second end openable in respective cages, said main pipes and the branch pipes being made of transparent, flexible tubing and being detachable from other parts of the system to be disassembled for cleaning and sterilization, said main pipe being divided into a plurality of consecutive portions or spans; coupling pipes each interposed between, and connecting adjacent spans of said main pipe, each of said coupling pipes having a further pipe connected to a respective branch pipe; and air vent means provided in said spans of the main pipe at positions thereof between adjacent coupling pipes, said main pipe having high portions and adjacent low portions, said air vent means being located substantially at the high portions.

8. A claim according to claim 7, wherein a mounting fixture supports the coupling pipes and is securable to a firm structure so as to position the coupling pipes.

9. A claim according to claim 8, wherein the mounting fixture has a front and a back side and at least one leaf spring having a first end portion fixed to the front side of the fixture and a second end portion extending outward from the first end portion, and wherein the second end portion is connectable to the spans of the main pipe so as to press the spans against the coupling pipes and the front side of the fixture.

10. A system according to claim 7, wherein the air vent means are located substantially at the apices of the high portions.

11. A system according to claim 10, wherein the coupling pipes and the further pipe have saw-like notches so that the spans and branch pipes respectively attached thereto are fitted frictionally and detachably to the coupling pipes and the further pipe and wherein at least one mounting hole in the fixture is provided for a coupling means to secure the fixture to a firm structure such as a wall or pillar.

12. A water supplying system for small animal cages, comprising: a main pipe connectable to a water supply source; branch pipes branching from the main pipe; headers connectable to lower ends of respective branch pipes; local pipes having a first end connectable to the headers and a second end openable in respective cages, said main pipe and the branch pipes being made of transparent, flexible tubing and being detachable from other parts of the system to be disassembled for cleaning and sterilization, said main pipe being divided into plurality of consecutive portions or spans; coupling means each interposed between adjacent spans of said main pipe and having a pair of transverse pipes and a further pipe, each end of said spans of the main pipe being fitted frictionally and detachably on the adjoining end of one of said transverse pipes, each of said branch pipes being fitted at an upstream end frictionally and detachably on one of said further pipe and at a downstream end being fitted frictionally and detachably on one of said headers; and air vent means provided on said main pipe wherein the spans of the main pipe can be bowed downward so that the air vent means is located at the highest portions of said spans.

13. A system according to claim 7 in which said main pipe and branch pipe are formed of silicone resin.

14. A system according to claim 7 in which said air vent means are provided on said coupling means communicatively therewith.

15. A system according to claim 7 in which said air vent means are provided on said spans communicatively therewith.

16. A system according to claim 12, wherein the coupling means are cross-shaped and have an upright pipe thereon, and wherein the branch pipes branch downward from the main pipe.

17. A system according to claim 16, wherein a mounting fixture supports the transverse pipes and is securable to a firm structure so as to position the transverse pipes.

18. A system according to claim 17, wherein the mounting fixture has a front and a back side and comprises at least one leaf spring having a first end portion fixed to the front side of the fixture and a second end portion extending outward from the first end portion, and wherein the second end portion is connected to the spans of the main pipe so as to press the spans of the main pipe against the transverse pipes and the front side of the fixture.

19. A system according to claim 18, wherein at least one mounting hole in the fixture is provided for a coupling means to secure the fixture to a firm structure such as a wall or pillar.

20. A system according to claim 19, wherein the transverse pipes, the upright pipe and the further pipe have saw-like notches for providing secure joints, between the main pipe and the transverse pipes, between the air vent means and the upright pipe and between the branch pipe and the further pipe.

* * * * *